United States Patent Office 2,803,432
Patented Aug. 20, 1957

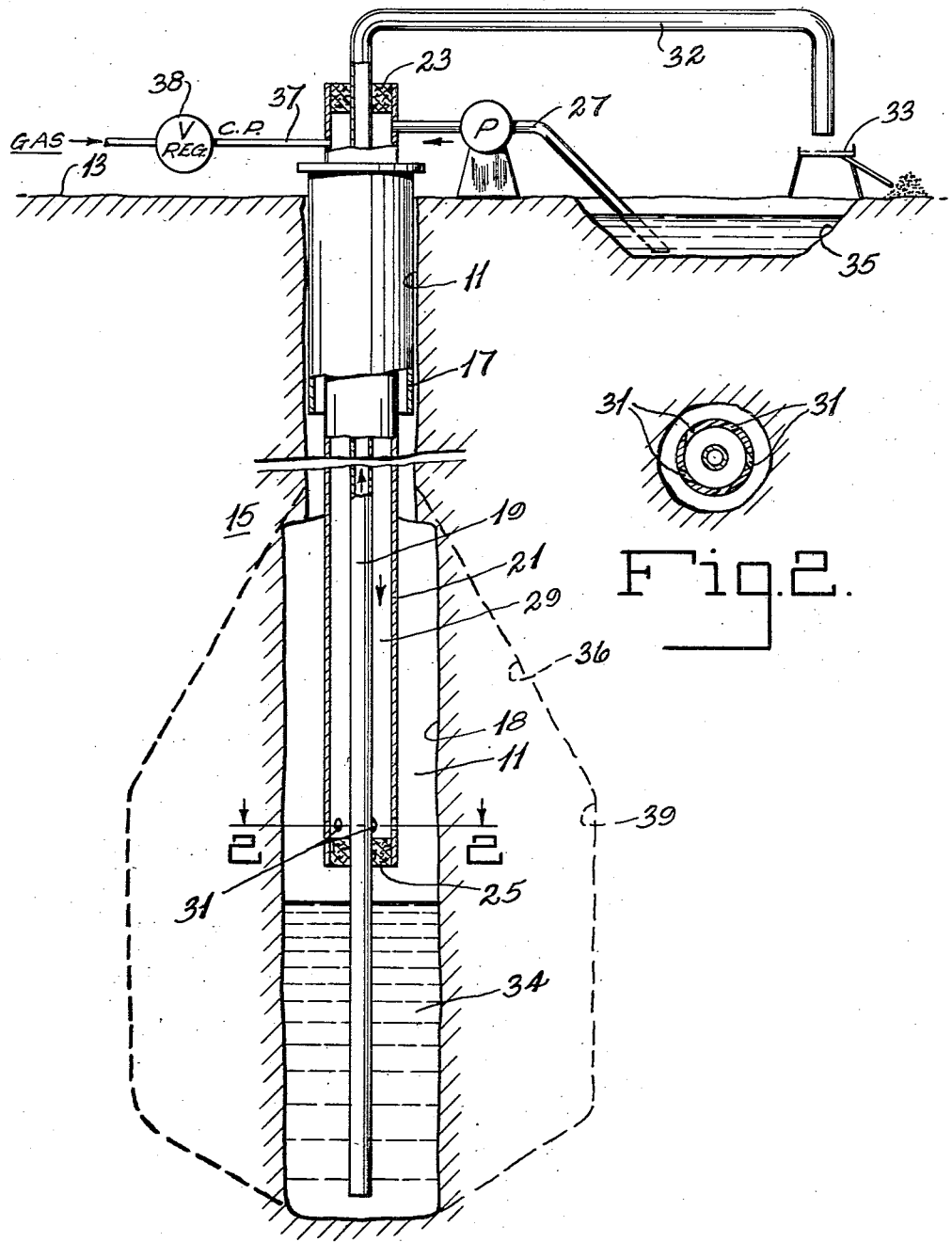

2,803,432

METHOD OF FORMING UNDERGROUND CAVITY

Charles F. Teichmann, Crestwood, N. Y., and Allen D. Garrison, Houston, Tex., assignors to Texaco Development Corporation, New York, N. Y., a corporation of Delaware Application August 23, 1952, Serial No. 305,964

5 Claims. (Cl. 255—1)

The present invention relates to the storage of fluids, such as liquefied petroleum gases, in underground storage cavities formed in clay beds beneath the surface of the earth.

Such fluids as liquefied petroleum gases have been stored successfully within tremendous cavities formed in salt formations hundreds of feet below the surface of the earth. Storage in salt cavities has proven quite successful but, unfortunately, underground salt formations suitable for this purpose are not available at every location where storage space is needed. It is well known that large underground clay formations are located in numerous places where no salt formations exist, but up to the present time there has been no known way for utilizing such clay formations to store fluids.

In accordance with the present invention we have found that a large underground storage cavity can be formed within a clay formation hundreds of feet below the surface of the earth by flowing into contact with such a clay body a deflocculant liquid which deflocculates the clay and forms a clay-laden liquid, which is then removed from the clay body to form a large cavity having a wall. While water alone is a liquid which has some deflocculating effect upon clay, we prefer to employ a water solution of one or more chemicals which have a more pronounced deflocculating effect, for example, the molecularly dehydrated phosphates.

After the cavity has been enlarged sufficiently it is advantageous to treat its walls to reduce their permeability, and to prevent further deflocculation during operation for storage purposes. Permeability can be decreased by treating the walls of the cavity with a material such as sodium silicate in water solution. While the sodium silicate can be employed alone in water solution, it is advantageous to react the deposited sodium silicate with a material which causes silicic acid or silica to precipitate from the sodium silicate solution and deposit within the pores of the clay wall. Another procedure for reducing permeability is to coat the walls with a polymerized plastic material such as rubber.

Continued deflocculation of the clay walls of the cavity can be avoided after its completion by treating the walls with a water solution containing a flocculating agent, such as one or more salts from the group consisting of sodium and potassium thiocyanates, chlorates, iodides, nitrates, bromides, chromates, and chlorides. These agents can be employed in a separate solution or in the sodium silicate solution previously mentioned.

In the drawing:

Fig. 1 is a schematic vertical sectional view of novel apparatus for creating a storage cavity in a bed of clay by the principles of the invention; and Fig. 2 is a cross-sectional view taken along the line 2—2 in Fig. 1.

More in detail in accordance with the invention, the first step after locating an underground clay bed of sufficient thickness is to drill a deep hole 11 from the surface of the earth 13 down through intervening overburden into the clay formation 15. The top portion of the hole 11 preferably is cased at 17 to prevent the caving of overburden as the hole progresses. The bottom portion of the hole desirably is under-reamed to increase its diameter, as at 18, thus expediting formation of the final cavity.

After completion of the hole 11 a long central pipe 19 terminating in an entrance is inserted to a point such that its entrance is a few inches from the bottom of the hole for the removal of clay-laden liquid to the surface 13.

Surrounding the central pipe 19 in spaced relation thereto is a second pipe 21 which also extends down from the surface 13 into the hole 11, but terminates a substantial distance above the bottom of the central pipe 19 for the injection of deflocculant liquid into the hole. Packing glands 23 and 25 are disposed in the annulus 29 between pipes 19 and 21 to prevent leakage of liquid while permitting the outside pipe 21 to be moved lengthwise along the central pipe 19 to enlarge the hole along its full length.

Deflocculant liquid is pumped through a conduit 27 and injected down through the annulus 29 between the two pipes and is then discharged into the hole 11 through a plurality of circumferentially spaced discharge ports 31 above the gland 25. The washing action of the deflocculant liquid is enhanced by discharging it through the ports 31 as a plurality of lateral streams or jets with such a high velocity that they impinge against the side walls of the hole and wash the deflocculated clay detritus down to the bottom where the clay-laden liquid 34 enters the central pipe 19 and is raised to the surface of the earth there to be discharged through a pipe 32 into a screen 33 which removes much of the clay, and thence into a slush pit 35 in which the remaining clay settles. The washing action is accentuated by so constructing the ports 31 that they extend generally tangentially at an angle to the pipe radius, as in Fig. 2, and thus discharge the liquid jets non radially so that they swirl around the wall of the hole.

Pipe 21 can be translated lengthwise of the hole to move the injected streams lengthwise and extend the hole diameter the full length of the desired cavity while maintaining the lower end of pipe 19 near the bottom of the hole. Preferably the movement at the top should be such as to form a conical ceiling 36 on the final cavity 39 to prevent caving of the ceiling.

While water alone has some deflocculating effect on clay, it is preferred to incorporate in the water one or more chemical compounds which increase the deflocculating effect and thus increase the speed of operation. Among such chemical compounds are the alkali and alkaline earth metal polyphosphates, such as sodium or potassium tetraphosphate and triphosphate. The deflocculating effect is aided by such materials even when present in very small amounts, but the effect increases progressively as the amount increases up to saturation. A suitable deflocculant liquid may contain between .001 and 0.50 percent of one or more of the above compounds.

The clay-laden deflocculant liquid 34 can be removed through the central pipe 19 in any desired way, as by employing a suction pump or by operation with the cavity full of liquid under a hydrostatic pressure head. We prefer, however, to force the liquid up at a rate such as to maintain the level of the liquid pool in the hole at a point some distance below the ports 31 and the streams therefrom, but a substanital distance above the entrance of pipe 19, by maintaining a layer of gas under pressure above the liquid, thus making it possible for the high velocity jets from ports 31 to flow through gas filled space and impinge directly against the side walls of the hole and exert the maximum washing effect. Any suitable gas such as natural gas, air, or carbon dioxide, can be employed, either independently or by introducing it from a conduit 37 into the annulus 29 to flow down into the hole along with the deflocculant liquid. A conventional pressure regulator 38 maintains a constant gas pressure in the hole.

Since the deflocculant liquid containing polyphosphates or other deflocculating chemicals is quite valuable, recirculation should be employed, as by pumping used liquid from the slush pit 35 back into the annulus 29. Make-up liquid can be added as needed.

It may be found in some clays that the deflocculant liquid acts so rapidly upon the clay wall of the hole that the proportion of deflocculated clay in the liquid pool 34 becomes too large to handle effectively. When such a situation arises it is desirable to retard deflocculation temporarily by injecting into the hole through the annulus 29 a water solution containing a flocculating material such as sodium or potassium chloride or the other materials mentioned previously herein to flow intermittently into contact with the clay body to retard the rate of clay removal from the cavity wall. After a short time the flow of deflocculating liquid can be resumed. This alternate action of deflocculating and flocculating liquids can be employed as often as necessary to maintain the steady progress of hole enlargement.

After the hole 11 has been enlarged to the desired diameter over the desired length to form a storage cavity 39, the clay walls of the cavity should be treated to assure impermeability, thus to prevent the leakage of liquefied petroleum gases or other liquids which are to be stored. This can be done by impregnating the wall of the hole with a sodium silicate solution to fill up the pores. For example, a water solution containing 10 to 20 percent by volume of a low alkali sodium silicate in which the molecular ratio of silica to sodium oxide falls within the range of from 3.9:1 to 1.5:1 can be introduced into the storage cavity to fill the latter, or can be applied to the walls by spraying it from the ports 31. If the sodium silicate treatment alone is not completely satisfactory, it can be followed by treatment with a solution of a multivalent salt such as calcium or aluminum chloride or a dilute acid solution such as dilute sodium chloride or hydrochloric acid, to precipitate silicic acid or silica.

Another procedure which can be used successfully is to spray such a sodium silicate solution on the walls of the storage cavity through ports 31 while maintaining within the storage cavity a large volume of a gas containing a sufficient quantity of carbon dioxide to react with the deposited sodium silicate and precipitate silicic acid. Such a gas can be introduced from conduit 37 before or after the silicate solution.

Not only should the walls of the storage cavity be rendered as impermeable as possible, but there must also be assurance that further deflocculation will not occur when the cavity is later operated for the storage of fluids. This can be accomplished by applying to the walls of the storage cavity 39 a solution of a flocculating chemical compound such as sodium or potassium chlorides, or any other salt selected from the group consisting of the sodium and potassium thiocyanates, chlorates, iodides, nitrates, bromides, chromates, and chlorides. While even minor quantities of these salts inhibit deflocculation, it is desirable to maintain the salt content of the solution within the range of from 20 percent by weight up to the saturation value of the dissolved component. The salt can be applied as a separate solution or can be incorporated in the sodium silicate solution previously mentioned.

After the storage cavity 39 has been completed as described above, it can be immediately used for the storage of a fluid such as liquefied petroleum gas. The cavity can be filled with a suitable control liquid such as a water solution and the liquefied petroleum gas then pumped down through the annulus 29 to displace solution up through the central pipe 19. When gas later is to be withdrawn from the storage cavity, solution is pumped down through the central pipe 19 and displaces gas up through the annulus 29. In order to maintain the walls of the storage cavity in a compact and impermeable condition it is advantageous to use as the control liquid a water solution of sodium silicate with or without a flocculant salt of the type described previously herein.

Obviously, many modifications and variations of the invention, as hereinbefore set forth, may be made without departing from the spirit and scope thereof, and therefore only such limitations should be imposed as are indicated in the appended claims.

We claim:

1. A method for extracting clay from an underground clay body and forming an underground storage cavity therein, said method comprising flowing into contact with said clay body a water solution of a deflocculant chemical, thereby deflocculating clay with said solution and forming clay-laden liquid; removing said clay-laden liquid from said clay body, thereby forming a cavity having a wall; depositing sodium silicate solution on said wall; and introducing carbon dioxide gas into said cavity to react with said sodium silicate and deposit a precipitate on said wall to reduce permeability thereof.

2. A method for extracting clay from an underground clay body and forming an underground cavity therein, said method comprising flowing into contact with said clay body a water solution of a deflocculant chemical; deflocculating clay with said solution and forming clay-laden liquid; removing said clay-laden liquid from said clay body, thereby forming a cavity having a wall; intermittently flowing into contact with said clay body a flocculant liquid to retard the rate of clay removal from said wall; and then resuming the flow of said water solution of a deflocculant chemical.

3. A method for extracting material from an underground earth formation and forming an underground cavity therein, said method comprising drilling a hole from the surface of the ground down into said formation; inserting a pair of spaced pipes into said hole and extending down into said formation, one pipe extending below the other pipe and terminating in an entrance near the bottom of said hole; injecting a material-removing liquid through said other pipe and thence through gas filled space against the wall of said hole in a plurality of high velocity lateral streams to wash removed material down from said wall and form a pool of material-laden liquid; maintaining the level of said pool below said streams, but a substantial distance above said entrance, by maintaining a layer of gas under super atmospheric pressure above said pool; and forcing material-laden liquid from said hole through said one pipe by the pressure of said gas at a rate such that the level of said pool is maintained below said lateral streams.

4. A method in accordance with claim 3 wherein said lateral streams are injected non-radially and swirl around said wall.

5. A method in accordance with claim 3, also comprising moving said streams lengthwise of said hole by translating said other pipe lengthwise to increase the size of said cavity while maintaining the lower end of said one pipe near the bottom of said hole.

References Cited in the file of this patent

UNITED STATES PATENTS

| | | |
|---|---|---|
| 342,274 | Wagner | May 18, 1886 |
| 671,429 | Bacon | Apr. 9, 1901 |
| 1,421,706 | Van Auken | July 4, 1922 |
| 1,438,588 | Feldenheimer | Dec. 12, 1922 |
| 1,776,889 | Claytor | Sept. 30, 1930 |
| 1,960,932 | Tracy | May 29, 1934 |
| 1,978,655 | Straight | Oct. 30, 1934 |
| 2,198,120 | Lerch | Apr. 23, 1940 |

(Other references on following page)

UNITED STATES PATENTS

| | | |
|---|---|---|
| 2,239,647 | Garrison | Apr. 22, 1941 |
| 2,251,916 | Cross | Aug. 12, 1941 |
| 2,322,484 | Stuart | June 22, 1943 |
| 2,326,577 | Teague et al. | Aug. 10, 1943 |
| 2,365,039 | Andresen | Dec. 12, 1944 |
| 2,590,066 | Pattinson | Mar. 18, 1952 |
| 2,720,381 | Quick | Oct. 11, 1955 |

FOREIGN PATENTS

| | | |
|---|---|---|
| 208,335 | Germany | Mar. 23, 1909 |